United States Patent
Faccinn et al.

(10) Patent No.: US 8,699,472 B2
(45) Date of Patent: Apr. 15, 2014

(54) COMMON CHARGING IDENTIFIER FOR COMMUNICATION NETWORKS

(75) Inventors: Stefano Faccinn, Dallas, TX (US); Tuija Hurtta, Espoo (FI); Balazs Bertenyi, Budapest (HU); Nedko Ivanov, Budapest (HU); Harri Honko, Tampere (FI); Juha-Pekka Koskinen, H=meenlinna (FI); Juha Vallinen, Tampere (FI); Merja Hopeaharju, Kangasala (FI)

(73) Assignee: Nokia Corporation (FI)

( * ) Notice: Subject to any disclaimer, the term of this patent is extended or adjusted under 35 U.S.C. 154(b) by 2508 days.

(21) Appl. No.: 09/758,267

(22) Filed: Jan. 12, 2001

(65) Prior Publication Data
US 2002/0127995 A1 Sep. 12, 2002

Related U.S. Application Data

(63) Continuation-in-part of application No. 09/636,738, filed on Aug. 11, 2000, now abandoned, which is a continuation-in-part of application No. 09/577,152, filed on May 24, 2000, now abandoned.

(51) Int. Cl.
*H04M 11/00* (2006.01)

(52) U.S. Cl.
USPC ........................................... 370/338

(58) Field of Classification Search
USPC .......... 370/352, 338, 400, 349, 356; 455/406, 455/407, 409, 415, 445; 379/114.28, 379/114.29, 126, 127.01, 127.04
See application file for complete search history.

(56) References Cited

U.S. PATENT DOCUMENTS 5,381,467 A * 1/1995 Rosinski et al. .......... 379/121.01
5,771,282 A * 6/1998 Friedes .................... 379/121.03
(Continued)

FOREIGN PATENT DOCUMENTS

CN       1124556       6/1996
JP     327605-1993     12/1993
(Continued)

OTHER PUBLICATIONS

ISO/IEC 7498-1 International Standard, Information Technlogoly—Open Systems Interconnection—Basic Reference Model: The basic Model; Nov. 15, 1994; ISO/IEC, second edition, entire document.*
(Continued)

*Primary Examiner* — Thai Nguyen
(74) *Attorney, Agent, or Firm* — Banner & Witcoff, Ltd.

(57) ABSTRACT

In a first embodiment, when an Activate PDP Context Request message is forwarded to a Service GPRS Support Node (SGSN), the SGSN creates a Create PDP Context Request message and forwards it to a Gateway GPRS Support Node (GGSN). In response to the Create PDP Context Request forwarded by the SGSN, the GGSN creates a Create PDP Context Response message. When a PDP context is created by the GGSN, the GGSN associates a Globally Unique Charging Identification (GCI) with the PDP context. Then, the Create PDP Context Response including the GCI is forwarded to the SGSN. The GCI is sent from the SGSN to the UE and from the UE to the CSCF. In a second embodiment, the GCI is sent from the SGSN or the GGSN directly to the Call State Control Function (CSCF). Sending the GCI can be performed either autonomously or based on a request from the CSCF. In either embodiment, the CSCF can send the GCI to a second network which performs processing, such as billing, from data collected from call detail records associated with the GCI.

28 Claims, 11 Drawing Sheets

(56) References Cited

U.S. PATENT DOCUMENTS

| | | | |
|---|---|---|---|
| 5,809,424 A | 9/1998 | Eizenhoefer | |
| 5,875,238 A * | 2/1999 | Glitho et al. | 379/114.28 |
| 6,070,076 A * | 5/2000 | Valentine | 455/445 |
| 6,141,404 A * | 10/2000 | Westerlage et al. | 379/118 |
| 6,195,543 B1 * | 2/2001 | Granberg | 455/407 |
| 6,278,874 B1 * | 8/2001 | Verdonk | 455/408 |
| 6,307,924 B1 * | 10/2001 | Rosenberg | 379/115.01 |
| 6,320,873 B1 * | 11/2001 | Nevo et al. | 370/466 |
| 6,408,173 B1 * | 6/2002 | Bertrand et al. | 455/406 |
| 6,463,275 B1 * | 10/2002 | Deakin | 455/406 |
| 6,496,690 B1 * | 12/2002 | Cobo et al. | 455/408 |
| 6,574,201 B1 * | 6/2003 | Kreppel | 370/328 |
| 6,608,832 B2 * | 8/2003 | Forslow | 370/353 |
| 6,707,813 B1 * | 3/2004 | Hasan et al. | 370/356 |

FOREIGN PATENT DOCUMENTS

| | | | |
|---|---|---|---|
| JP | 170625-1998 | 6/1998 | |
| JP | 304433-1998 | 11/1998 | |
| WO | 9522230 | 8/1995 | |
| WO | 9726739 | 4/1997 | H04L 12/56 |
| WO | 9916266 | 4/1999 | |
| WO | 9941928 | 8/1999 | H04Q 7/38 |
| WO | 9956445 | 11/1999 | H04L 29/06 |

OTHER PUBLICATIONS

Fourth Office Action in CN01813343.6 dated May 27, 2010.
International Search Report for PCT/IB01/00890 dated Sep. 11, 2002.
Written Opinion for PCT/IB01/00890 dated Nov. 29, 2002.
International Preliminary Examination Report for PCT/IB01/00890 dated Jan. 21, 2003.
Communication in EP0193199739-1244 dated Sep. 2, 2003.
Notice of Rejection Reasons for JP2001-541267 dated Aug. 15, 2005.
Decision of Rejection for JP2001-586906 dated Apr. 28, 2006.
3rd Generation Partnership Project; Technical Specification Group Services and System Aspects; 3G Charging; Call Event Data (3G TS 32.105 version 0.0.1 Release 1999).
3rd Generation Partnership Project; Technical Specification Group Services and System Aspects; GSM call and event data for the packet switched domain (Release 1989), 3G TS 32.015, version 3.1.1, France, 3GPP Organizational Partners (ARIB, CWTS, ETSI, T1, TTA, TTC), Mar. 2000.
First Office Action in CN01813343.6 dated May 14, 2004.
Second Office Action in CN01813343.6 dated Oct. 29, 2004.
Decision on Rejection in CN01813343.6 dated Mar. 11, 2005.
Notification of Third Office Action in CN01813343.6 dated Nov. 28, 2008.
Notice of Rejection Reasons (Summary) for JP2001-586906 dated Aug. 11, 2005.
Notification of Fifth Office Action of CN01813343.6 with English Translation dated Oct. 11, 2010.
Notification of 6th Office Action in CN 01813343.6 dated Feb. 22, 2011.
3rd Generation Partnership Project; Technical Specification Group Services and System Aspects; 3G Charging; Call Event Data (3G TS 32.015, version 3.1.1, France, 3GPP Organizational Partners (ARIB, CWTS, ETSI, T1, TTA, TTC), Mar. 2000.
Rejection Decision in CN01813343.6 dated Jul. 4, 2011 with English translation.

* cited by examiner

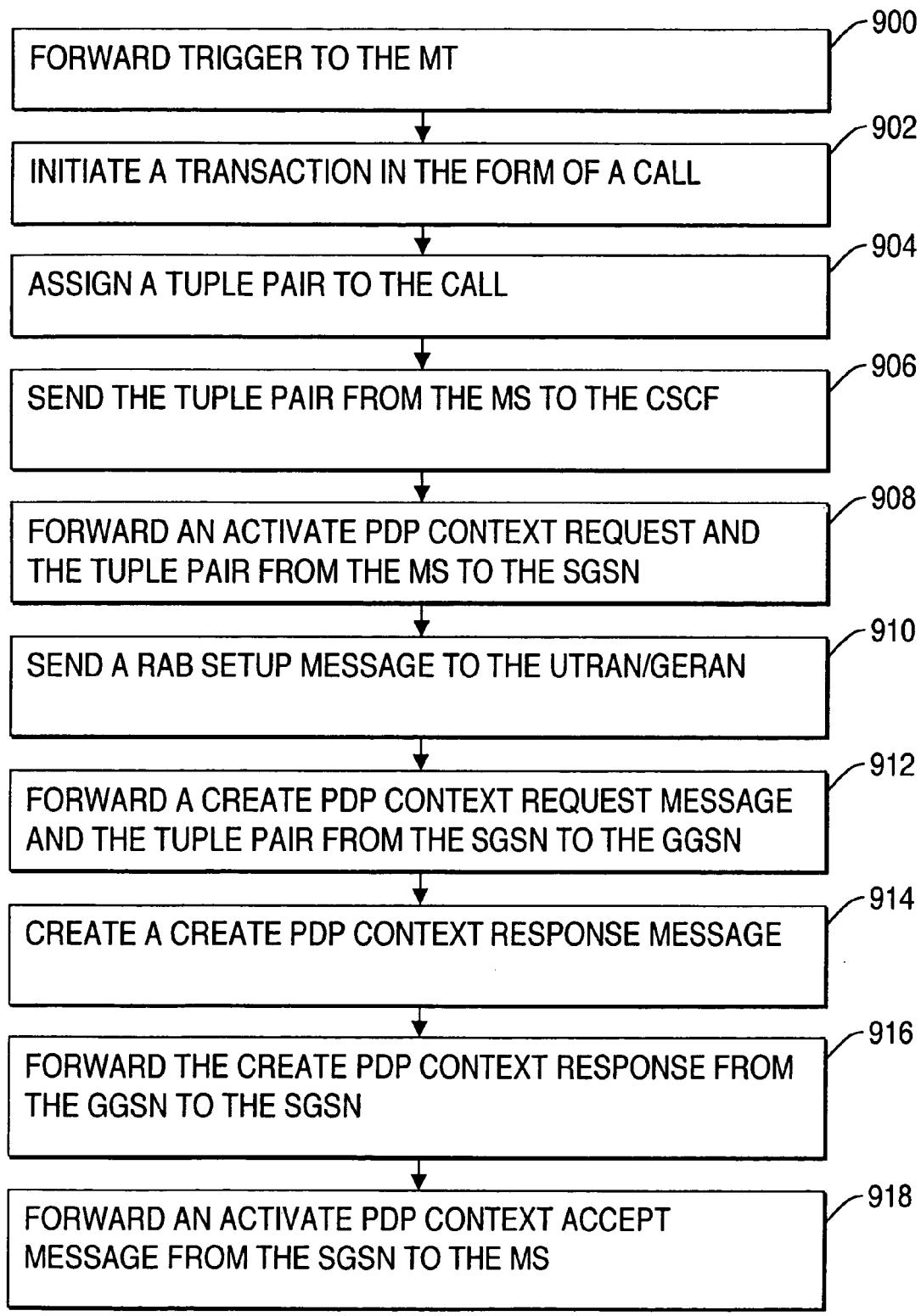

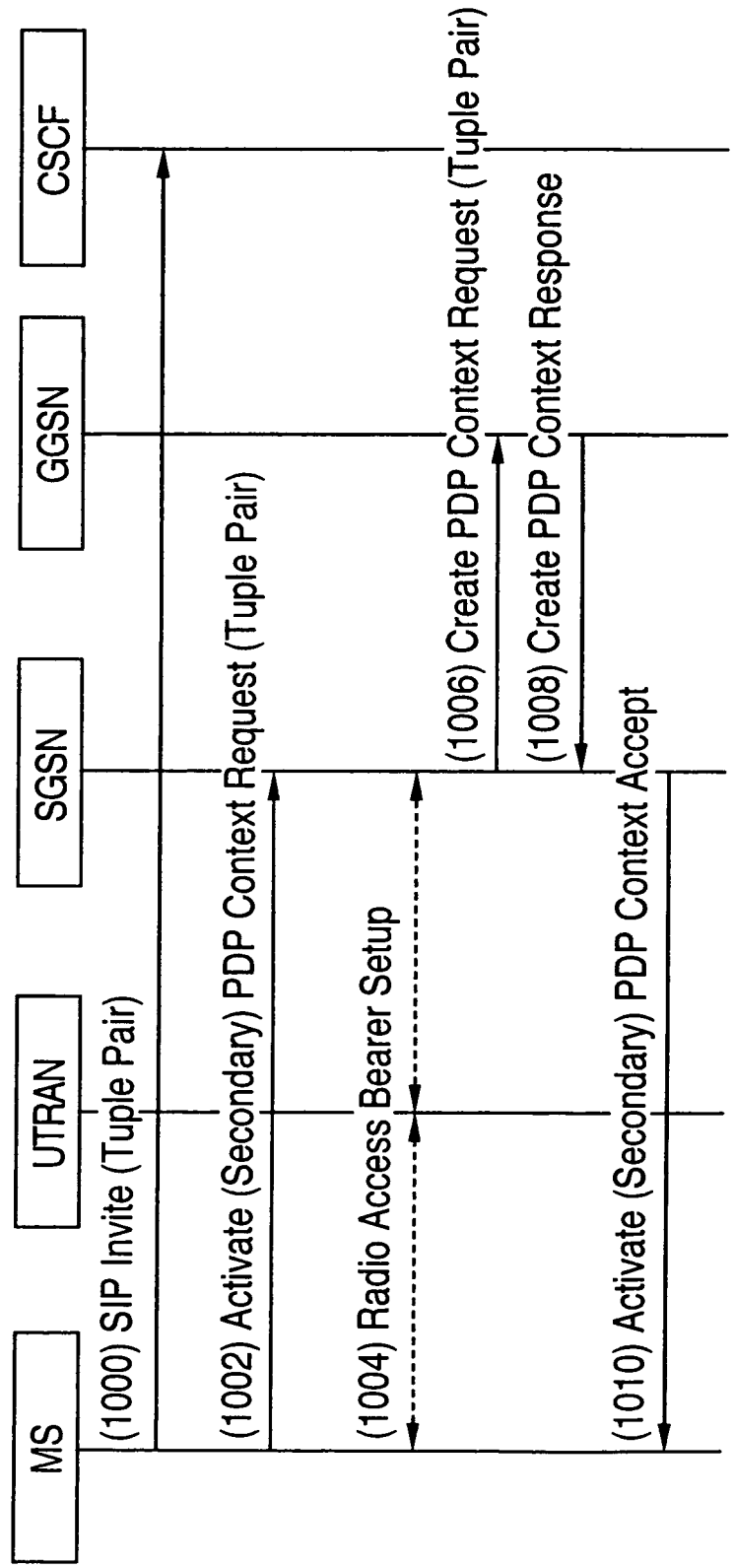

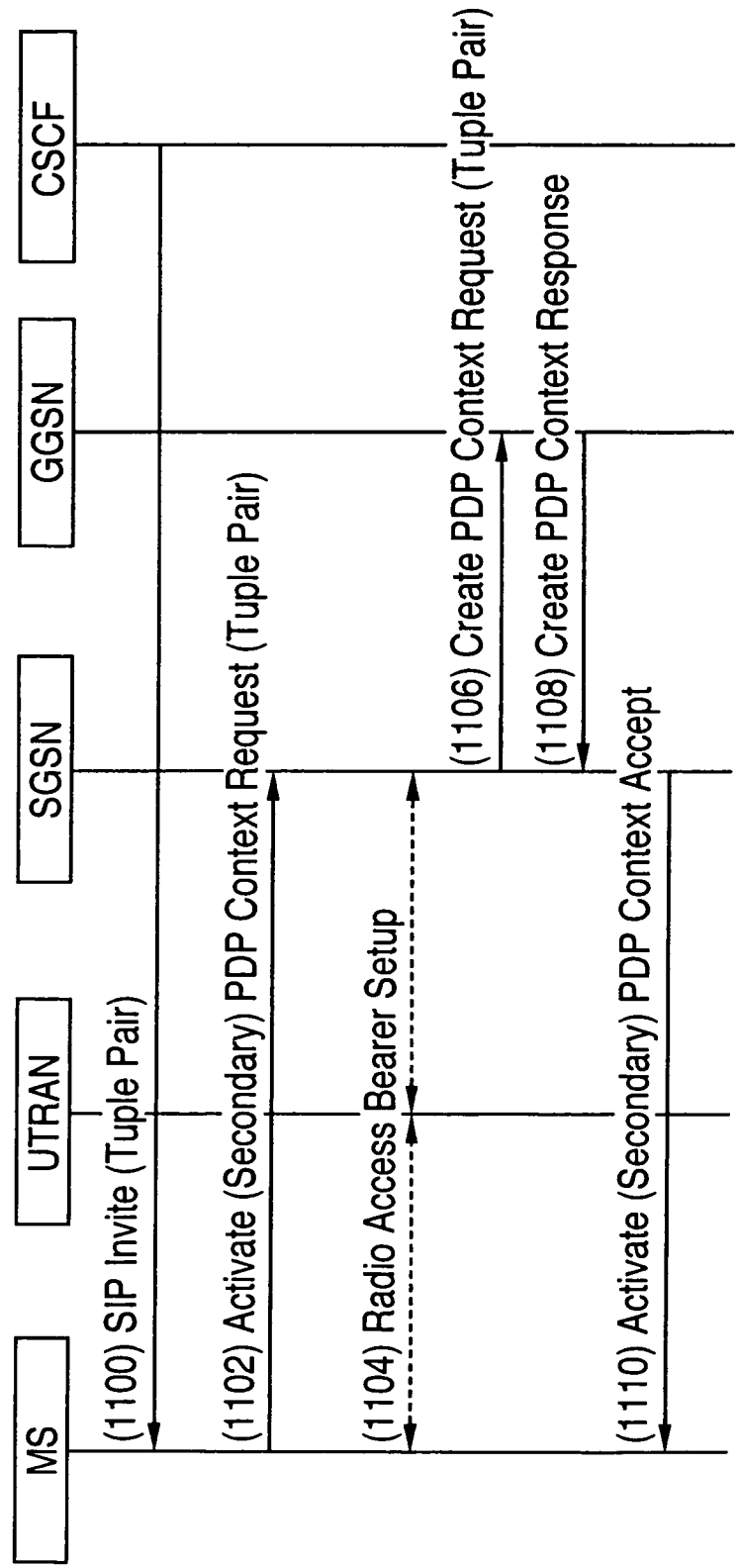

COMMON CHARGING IDENTIFIER FOR COMMUNICATION NETWORKS

CROSS-REFERENCE TO RELATED APPLICATIONS

This application is a continuation-in-part of U.S. application Ser. No. 09/636,378, filed on Aug. 11, 2000 now U.S. Pat. No. 6,584,737 and entitled "CHARGING COORDINATION AND SENDING A CHARGING IDENTIFICATION IN A MOBILE NETWORK", which in turn is a continuation-in-part of U.S. application Ser. No. 09/577,152, filed May 24, 2000 and entitled "SENDING A CHARGING IDENTIFICATION IN A MOBILE NETWORK."(now abandoned).

BACKGROUND OF THE INVENTION

1. Field of the Invention

The present invention relates to communication networks and, more particularly, the present invention relates to techniques for charging coordination and other kinds of information coordination, and a common charging identifier for communication networks.

2. Description of the Related Art

In general, packet switched wireless networks provide communications for mobile terminals with no physical connection required for network access. The General Packet Radio Service (GPRS) in the Global System for Mobile Communications (GSM) and the Universal Mobile Terrestrial System (UMTS) have both been developed to provide wireless communications networks with a packet switched side, as well as a circuit switched side.

The specifications for UMTS networks with further improvements have been released by the 3rd Generation Partnership Program (www.3gpp.org). Release 00 of the UMTS specifications provides that a network subscriber can have one or more packet data protocol (PDP) addresses. Each PDP address is described by one or more PDP contexts in the Mobile Terminal (MT), the Service GPRS Support Node (SGSN), and the Gateway GPRS Support Node (GGSN). The GGSN is a gateway to external networks. Each PDP context may have routing and mapping information for directing the transfer of data to and from its associated PDP address and a traffic flow template (TFT) for filtering the transferred data.

Each PDP context can be selectively and independently activated, modified, and deactivated. The activation state of a PDP context indicates whether data transfer is enabled for a corresponding PDP address and TFT. If all PDP contexts associated with the same PDP address are inactive or deactivated, all data transfer for that PDP address is disabled. All PDP contexts of a subscriber are associated with the same Mobility Management (MM) context for the International Mobile Subscriber Identity (IMSI) of that subscriber. Setting up a PDP context means setting up a communication channel.

FIG. 1 is a process flow diagram that illustrates an example of the PDP context activation procedure. In step 100, the MT sends an Activate PDP Context Request to the SGSN. The Activate PDP Context Request message sent in step 100 includes a number of parameters. The parameters include a PDP address and an Access Point Name (APN). The PDP address is used to indicate whether a static PDP or dynamic PDP address is required. The APN is a logical name referring to the Gateway GPRS Support Node (GGSN) to be used.

In step 102, the SGSN sends a Radio Access Bearer (RAB) setup message to the UMTS Terrestrial Radio Access Network (UTRAN) or the GERAN or other corresponding radio access networks. In step 104, the SGSN sends a Create PDP Context Request message to the affected GGSN. The GGSN decides whether to accept or reject the request. If it accepts the request, it modifies its PDP context table and returns a Create PDP Context Response message in step 106. The SGSN then sends an Activate PDP Context Accept message to the Mobile Terminal in step 108.

In Release 00 of the Universal Mobile Telecommunications System specifications (UMTS), a new architecture with existing and new logical entities is introduced to support IP multimedia services including, e.g., IP telephony. SIP (Session Initiation Protocol) is used for call control. The caller allocates a Call Id, which is included in SIP messages. The Call Id uniquely identifies the call and is used by all call participants However, the use of the Call ID is complicated in the case of a mobile station (MS) comprised of mobile terminal (MT) and terminal equipment (TE) parts since the MT driver in the TE is preferably able to filter the UDP/IP packets forwarded to the MT, and be able to parse the majority if not the entire SIP grammar to find the Call-ID field contained somewhere in a UDP datagram.

The subscribers of voice services are accustomed to receiving bills based on calls, not based on the transport resources used for making the calls. Subscribers of IP telephony often expect similar billing criteria. Consequently, billing for the services used (e.g., for the calls) rather than the transport resources used is becoming increasingly important. In the case of Wireless Application Protocol (WAP) services, billing for services rather than transport resources is already the expectation.

For an IP telephony call, a PDP context is required to carry the actual voice traffic. Both the GPRS/UMTS layer and the IP telephony layer collect charging information (CDRs): the GPRS/UMTS layer collects charging information for the PDP context while the IP telephony layer collects charging information for the call. A common identifier ought to be added to the CDRs to make it possible to bill based only on the CDRs created by the IP telephony layer (i.e., for services) and to omit the CDRs created by the GPRS/UMTS layer (i.e., for transport resources).

A common identifier is needed in the CDRs created by the GPRS/UMTS layer and by the IP telephony layer to make it possible to omit certain CDRs and enable billing based on services rather than use of transport resources. More specifically, in many cases it would be advantageous to selectively omit CDRs created by the GPRS/UMTS layer or CDRs created by the IP telephony layer. If that were possible, the billing would be operator-specific, in that the operator could decide how to bill the subscribers (how to use the created CDRs).

In spite of the numerous details provided in the aforementioned protocol, many features associated with mobile networks have not been dealt with. Specifically, charging information can be created by the SGSN, the GGSN and by the IP telephony network elements, e.g. the CSCF. At present there is no solution in place to associate the charging information created by the SGSN, the GGSN and the charging information created by the CSCF. Indeed, the network may be so complicated (e.g., the charging data may be generated in many different network elements) that it is not possible to combine all call event related data. At least some of this data is needed in order to implement network functionality such as hot billing or merely to allow a network operator to implement joint billing for GPRS services and IP telephony services.

SUMMARY OF THE INVENTION

According to a first illustrative embodiment of the invention, when an Activate PDP Context Request message is forwarded to a Service GPRS Support Node (SGSN) by an MT, the SGSN creates a Create PDP Context Request message and forwards it to a Gateway GPRS Support Node (GGSN). In response to the Create PDP Context Request forwarded by the SGSN, the GGSN creates a Create PDP Context Response message. When a PDP context is created by the GGSN, the GGSN associates a Charging Identification parameter with the PDP context. Then, the Create PDP Context Response including the Charging Identification parameter is forwarded to the SGSN. In response to the PDP Context Response forwarded by the GGSN to the SGSN, the SGSN forwards an Activate PDP Context Accept message to the MT. According to the first embodiment of the invention, both the Charging Identification parameter and possibly the GGSN address are provided to the MT in the Activate PDP Context Accept message. As described herein, the mobile station (MS) includes two parts: the terminal equipment (TE) and the mobile terminal (MT). The MS may also be referred to as user equipment (UE). The TE can, e.g., be a laptop which is then connected to the MT. The MT can be a mobile phone.

Sending the GGSN address is not mandatory. Another alternative is that the CSCF adds the IP address of the MS to the charging records (CDRs) that it creates for a call. The SGSN and the GGSN already add the PDP address of the PDP context to the CDRs. By checking that the PDP address is the same as the IP address, it can be ensured that the PDP context has been used for the call in question. Since this requires that the charging identifications are the same, the CSCF adds the Charging Identification to the CDRs that it creates for the call in question.

According to a second illustrative embodiment of the invention, the Charging Identification can be sent from the SGSN or the GGSN to the Call State Control Function (CSCF). When an Activate PDP Context Request message is forwarded to the SGSN, the SGSN creates a Create PDP Context Request message. The SGSN sends the Create PDP Context Request to the GGSN. In response to the Create PDP Context Request received from the SGSN, the GGSN creates a Create PDP Context Response. The GGSN associates the Charging Identification parameter with the PDP context. The Create PDP Context Response including the Charging Identification parameter is then forwarded to the SGSN.

The Charging Identification parameter can be sent from either of the SGSN or the GGSN directly to the CSCF; and, such sending of the Charging Identification parameter can be performed either autonomously, e.g., at PDP context activation, or based on a request from the CSCF.

In a specific embodiment, the CSCF sends the charging identification towards an endpoint of a communication, and sends security information together with said charging identification toward the endpoint. The CSCF is able to send an address of a GGSN together with the charging identification to the endpoint. If the GGSN address is not sent with the charging identification, the CSCF adds the IP address of the mobile station (UE) to the CDRs.

In a variation of the first and second illustrative embodiments, the Charging Identification parameter is a Globally Unique Charging Identification (GCI). (Although referred to in this application as "globally" unique, the charging identification need only be utilized by as few as only two networks.) The GCI is used during a call to ease combination of call event related data from different network elements. One particular feature of the embodiment is that the GCI can be generated by any network element. It can be generated by the SGSN, GGSN or CSCF. Such a network element can be a $2^{nd}$ generation network element or a $3^{rd}$ generation network element. In any event, the network elements (other than the network element which generated the GCI) do not need to generate a charging identification, but instead use the GCI generated by the other network element. The GCI can be used to ease combination of all call event related data or any portion thereof. As an example, the GCI and all the charging data for a call event can be collected and used by another network, such as one including a post-processing system providing billing for network subscribers.

The principles of the invention are applicable to other types of communication channels in addition to PDP contexts.

For an IP telephony call, a PDP context is required to carry the actual voice traffic. Both the GPRS/UMTS layer and the IP telephony layer collect charging information (CDRs): The GPRS/UMTS layer collects charging information for the PDP context while the IP telephony layer collects charging information for the call. According to a third illustrative embodiment of the invention, a common identifier is added to the CDRs, which, for example, makes it possible to bill based on the CDRs created by the IP telephony layer (i.e., for services) and omit the CDRs created by the GPRS/UMTS layer (i.e., for transport resources).

According to the principles of the third embodiment of the invention, the common identifier is associated with the CDRs created by the GPRS/UMTS layer and by the IP telephony layer. The common identifier enables charging coordination and other kinds of information coordination.

A call in SIP is identified by the Call Identification which is used as the common identifier. The Call Identification is allocated by the caller and included in the SIP messages. The MS sends the SIP messages to the called party via the CSCF. The CSCF intercepts the SIP messages and can thereby obtain the Call Identification from the SIP messages.

To use the Call Identification for charging coordination or other kinds of information coordination in accordance with the principles of the invention, the MS sends the Call Identification to the SGSN and the GGSN during PDP context activation. More specifically, the MS sends the Call Identification to the SGSN along with the Activate (Secondary) PDP Context Request message, and the SGSN forwards the Call Identification to the GGSN along with the Create PDP Context Request message.

The process described herein works for both mobile-originated calls (where the MS allocates the Call Identification) and mobile-terminated calls (where the MS receives the Call Identification in the SIP Invite message). According to the process described herein, the SGSN and the GGSN add the Call Identification to the CDRs that they create for the PDP context, and the CSCF adds the Call Identification to the CDRs that it creates for the call.

A fourth embodiment of the invention is similar to the third embodiment, except that a unique identifier is formed by using the UDP port number present in the SDP syntax of SIP "INVITE" and "183 Session Progress" messages instead of the Call-ID field.

In either of these embodiments, an operator is given greater flexibility in deciding how to bill subscribers for the created CDRs. The operator can selectively omit billing for CDRs created by the GPRS/UMTS layer while choosing to bill for CDRs created by the IP telephony layer.

Other aspects and advantages of the invention will become apparent from the following detailed description and accompanying drawings, illustrating by way of example the features of the invention.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

FIG. 9 is a generalized process flow diagram illustrating sending a tuple or tuple pair in accordance with a fourth embodiment of the invention.

FIG. 10 is a generalized signaling flow diagram illustrating coordination of the application layer and transport layer in accordance with an arrangement of the third embodiment of the invention.

FIG. 11 is a generalized signaling flow diagram illustrating coordination of the application layer and transport layer in accordance with another arrangement of the fourth embodiment of the invention.

DETAILED DESCRIPTION OF THE INVENTION

Figure 1:
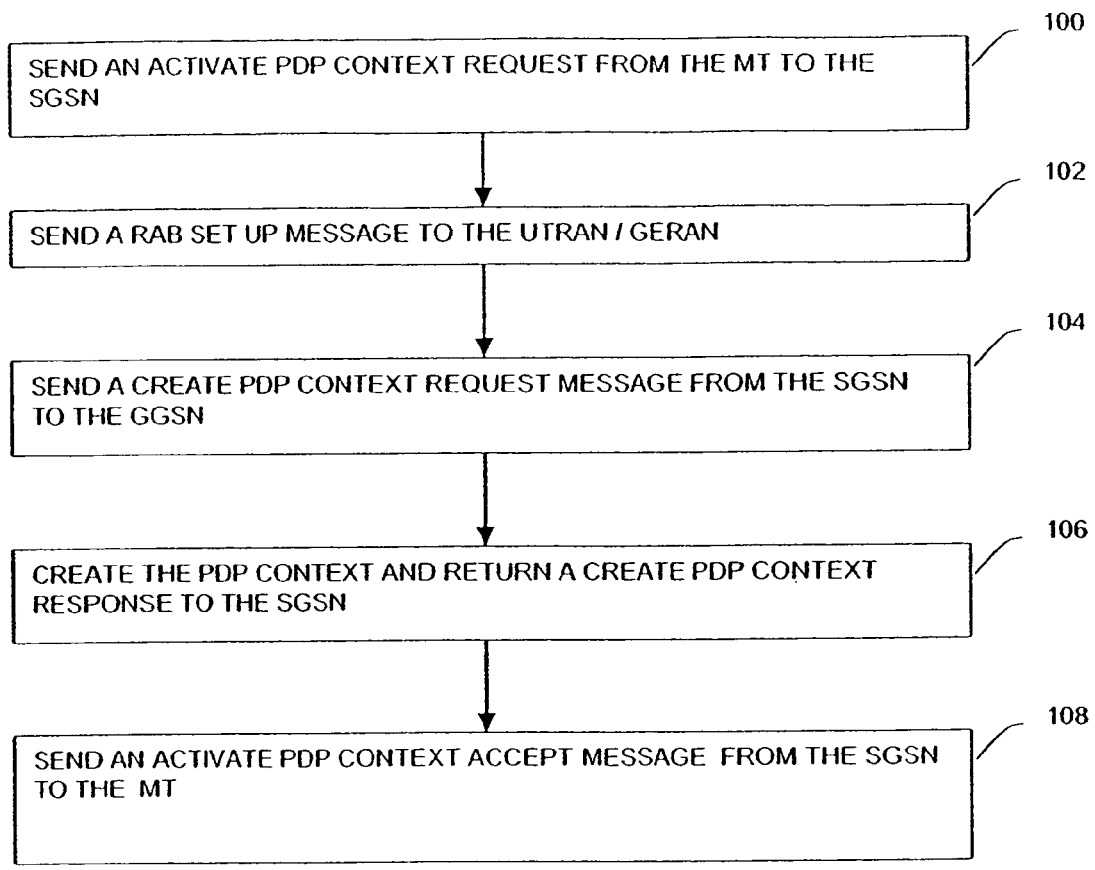
FIG. 1 is a generalized process flow diagram illustrating the PDP context activation procedure.

Before beginning a detailed description of the subject invention, mention of the following is in order, when appropriate, like reference numerals and characters may be used to designate identical, corresponding, or similar components in differing drawing figures. Furthermore, in the detailed description to follow, example sizes/models/values/ranges may be given, although the present invention is not limited thereto.

Figure 2:
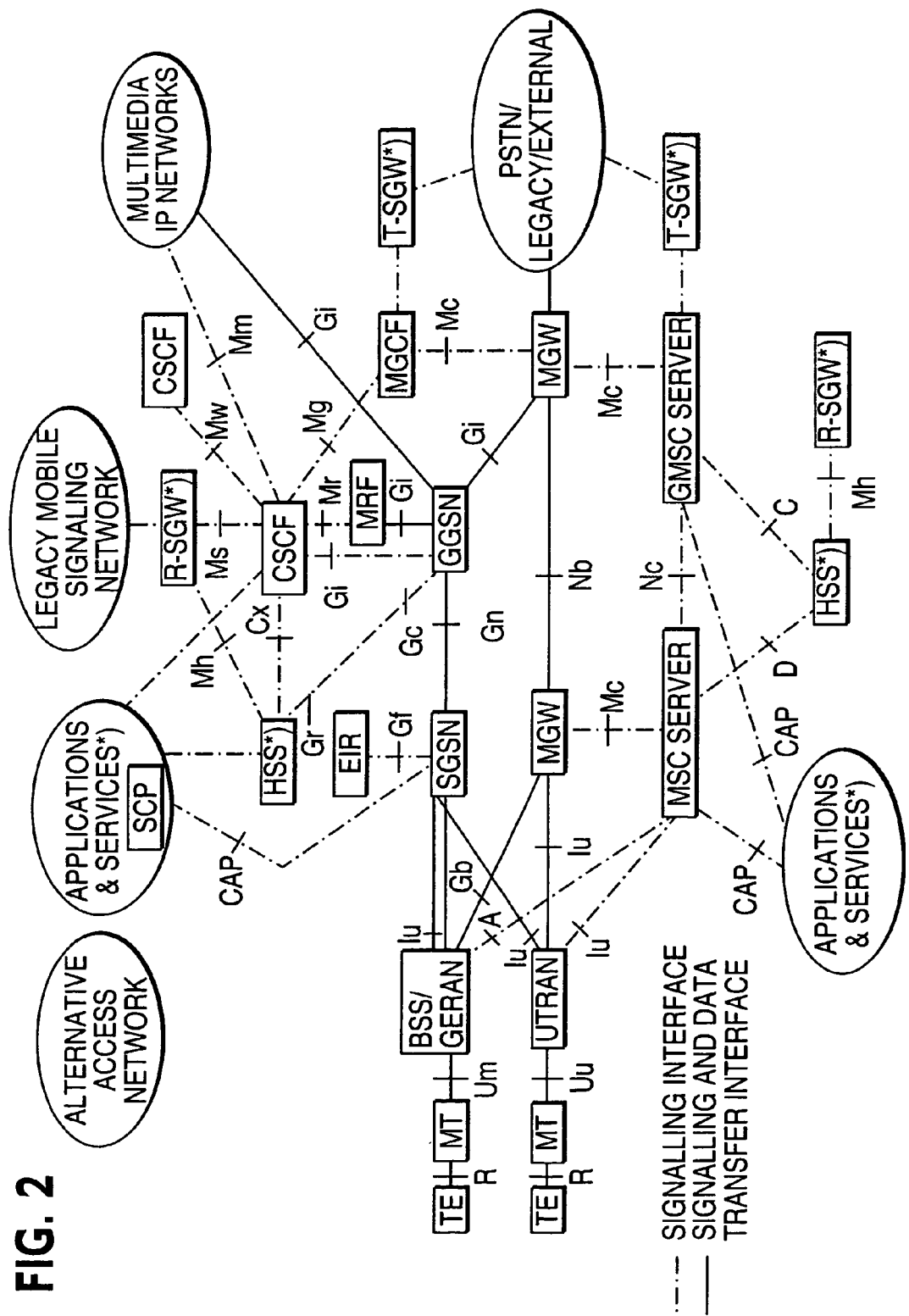
FIG. 2 is a generalized block diagram of the architecture of a packet switched wireless communication network in which the example embodiments of the invention can be practiced.

An example of a network architecture supporting these specifications is the wireless communications network shown in the block diagram of FIG. 2. The various elements of the network and their functions are described in the General Packet Radio Service (GPRS) Service Description, Stage 2, 3GPP TS 23.060, published by the 3rd Generation Partnership Program (www.3gpp.org). The elements and their functions may be described in earlier or later versions of the 3GPP TS 23.060 specifications or may be those of any other known packet switched wireless communications network. The description of network elements and their functions are merely a non-limiting example of packet switched wireless communication networks.

Several elements of the example network illustrated in FIG. 2 are particularly relevant to this invention. The Mobile Terminal (MT), commonly referred to as a cell phone or a mobile phone, is only one possible part of User Equipment (UE). Typically, Terminal Equipment (TE), used together with a Mobile Terminal (MT), constitutes User Equipment (UE), which is also referred to as a Mobile Station (MS). Any UE may be utilized in conjunction with this invention so that it operates or can be programmed to operate in the manner described below. The UMTS Terrestrial Radio Access Network (UTRAN) and the Base Station System (BSS) in GPRS manage and control the radio access between the core network and a number of MTs. There are also other possible radio access networks like GERAN.

The CSCF is a network element in an IP telephony network. The IP telephony network is sometimes referred to as "the application layer". The structure and function of the Call State Control Function (CSCF) can be divided into several logical components, which are currently internal to the CSCF. Every CSCF acting as a Serving CSCF has a Call Control Function (CCF) function. The CSCF includes an ICGW (Incoming call gateway). The ICGW acts as a first entry point. The ICGW performs routing of incoming calls. Incoming call service triggering (e.g. call screening/call forwarding unconditional) may need to reside for optimization purposes. The ICGW performs Query Address Handling (implies administrative dependency with other entities); and communicates with the Home Subscriber Server (HSS).

The CCF (Call Control Function) performs call set-up/termination and state/event management; interacts with MRF in order to support multi-party and other services; reports call events for billing, auditing, intercept or other purposes; receives and process application layer registration; performs query address handling (implies administrative dependency); and may provide service trigger mechanisms (service capabilities features) towards application & services network (VHE/OSA). The CCF may invoke location based services relevant to the serving network, and may check whether the requested outgoing communication is allowed given the current subscription.

The CSCF includes a SPD (Serving Profile Database). The SPD interacts with HSS in the home domain to receive profile information for the R00 all-IP network user and may store them depending on the SLA with the home domain. The SPD notifies the home domain of initial user's access (which includes, e.g., CSCF signaling transport address, user ID, etc.) The SPD may cache access related information (e.g. terminal IP address(es) where the user may be reached, etc.)

The CSCF performs AH (Address Handling) function. The AH function includes analysis, translation, modification, if required, address portability, and mapping of alias addresses. The AH function may do temporary address handling for inter-network routing.

The Serving GPRS Support Node (SGSN) is the node that serves the MT. At PDP context activation, the SGSN establishes a PDP context used for routing purposes. The Gateway GPRS Support Node (GGSN) is the node accessed by the external packet data network due to evaluation of the PDP address. It contains routing information for attached GPRS/UMTS users. The routing information is used to tunnel Protocol Data Units (PDUs) to the SGSN. The SGSN and GGSN functionalities may reside in different physical nodes or may be combined in the same physical node, for example, the Internet GPRS Support Node (IGSN).

The IP-based mobile network architecture includes an application layer and a transport layer. The transport layer protocols and mechanisms are usually optimized for the specific type of access whereas the application layer is normally generic, that is independent of the type of access.

In IP-based mobile networks, the UE sets up a call by signaling to the peer entity and exchanging messages of a call control protocol over an IP connection provided by the transport layer. In setting up a call in the application layer, the underlying transport layer has to set up the transport bearers over the radio interface and in the transport network. For an IP-based mobile network, setting up of transport bearers means allocating radio resources and network resources. The call control signaling is transparently exchanged over an IP connection provided by the transport layer.

Embodiment 1

Figure 3:
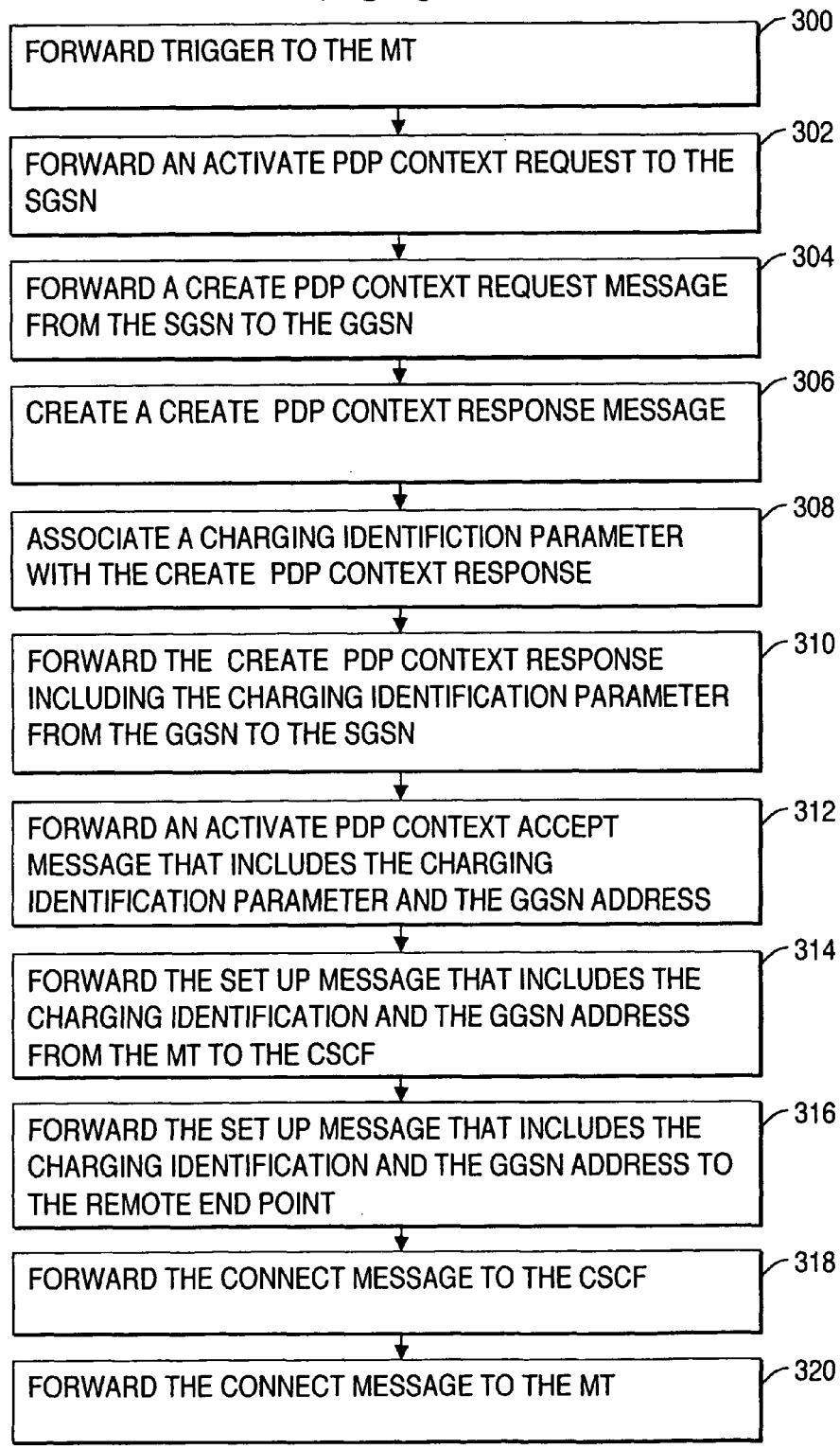
FIG. 3 is a generalized process flow diagram illustrating sending a charging identification in accordance with a first embodiment of the present invention.

FIG. 3 illustrates a process of sending a charging identification in accordance with a first embodiment of the present invention. In UMTS all-IP networks, when GPRS/UMTS is adopted as access/transport network for multimedia and voice over IP services, charging will be performed independently at the GPRS/UMTS layer and at the application layer (e.g., the CSCF).

In the GPRS and UMTS networks, PDP contexts are created by the GGSN upon request from the SGSN (with a Create PDP Context Request message) that, in turn, receives the request from the MT (an Activate PDP Context Request message).

As illustrated in FIG. 3, the technique in accordance with the present invention begins at the application layer at step 300 in which a trigger is forwarded from the TE (Terminal Equipment) to the MT (Mobile Terminal). The trigger may be, e.g., a call set up indication including the requested logical channels and characteristics, sent from the TE to the MT to start PDP context activation.

At step 302, an Activate PDP Context Request message is forwarded to the SGSN. In response thereto, in step 304, the SGSN creates a Create PDP Context Request message and forwards it to the GGSN. In response to the Create PDP Context Request forwarded by the SGSN, in step 306, the GGSN creates a Create PDP Context Response message.

In step 308, when a PDP context is created by the GGSN, the GGSN associates a Charging Identification parameter with the PDP context in step 308. Then, in step 310, the Create PDP Context Response message including the Charging Identification parameter is forwarded to the SGSN.

In turn, in response to the PDP Context Response forwarded by the GGSN to the SGSN, in step 312, the SGSN forwards an Activate PDP Context Accept message to the MT. According to the first embodiment of the invention, both the Charging Identification parameter and the GGSN Address are provided to the MT in the Activate PDP Context Accept message.

The above noted procedures in steps 300-312 are repeated as many times as needed depending on the PDP contexts needed.

Upon the completion of the last procedure in step 312, the UE forwards a call set up message, including requested logical channels and characteristics, to the CSCF (Call State Control Function) in step 314. The MT will, in turn, provide the Charging Identification and the GGSN Address to the CSCF within the call set up message. The CSCF, in turn, forwards the call set up message, including requested logical channels and characteristics, to the remote end point in step 316. The remote end point then forwards a response message, including accepted logical channels and characteristics, back to the CSCF in step 318. The CSCF then forwards the response message, including accepted logical channels and characteristics, to the UE in step 320. The response message may be, e.g., the Connect message in H.323 or a SIP response message, but not necessarily limited to those.

The invention contemplates that the Charging Identification parameter can be made more secure by applying appropriate cryptographic algorithms to avoid a false Charging Identification being forwarded by a malicious MT to the CSCF instead of the legitimate value, or a malicious MT re-using a value of the Charging Identification.

From the foregoing, it will be appreciated that in the first embodiment of the invention, the Charging Identification parameter is sent from the SGSN to the UE and from the UE to the CSCF.

Embodiment 2

Figure 4:
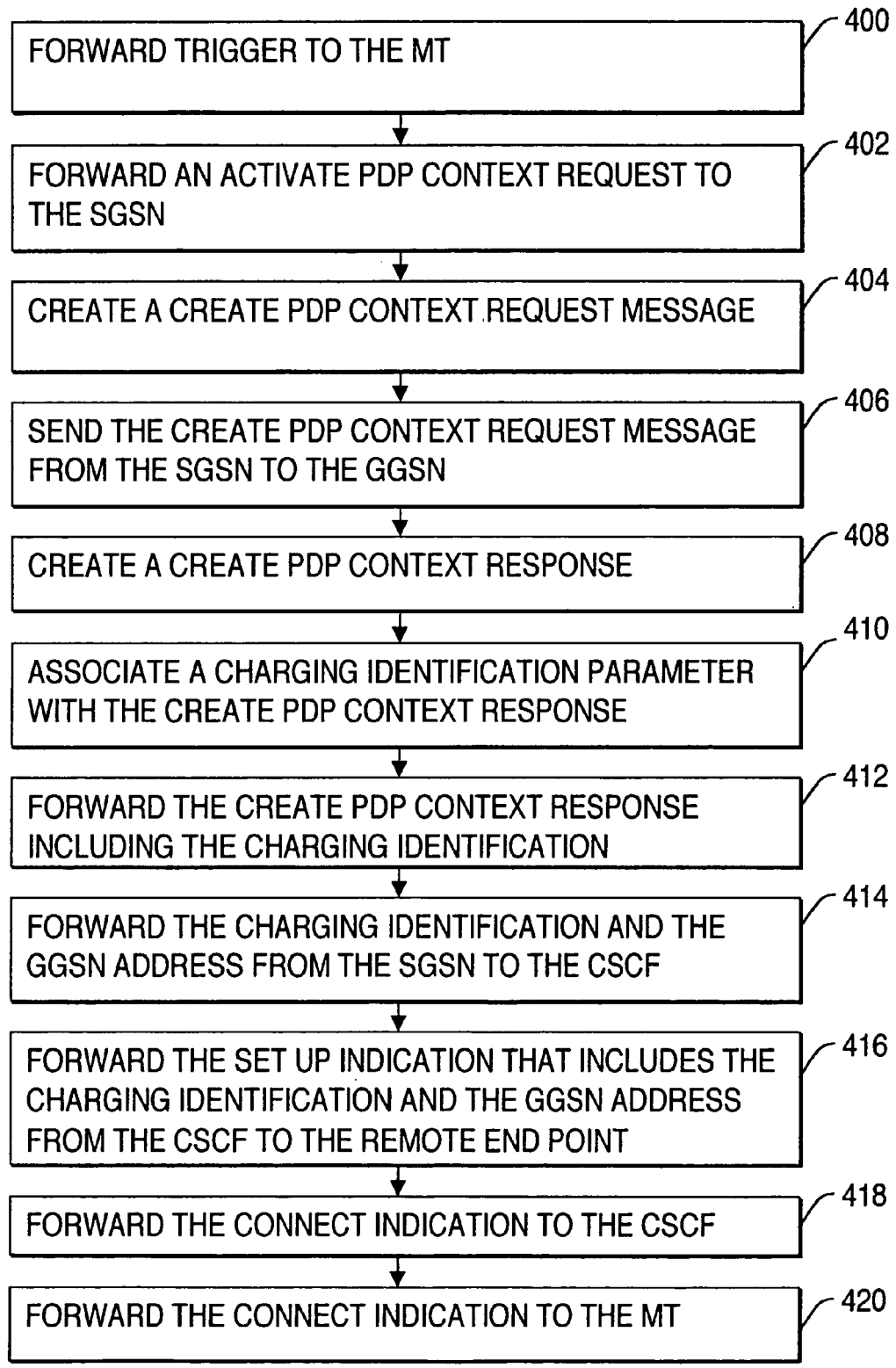
FIG. 4 is a generalized process flow diagram illustrating sending a charging identification in accordance with an arrangement of a second embodiment of the present invention.

FIG. 4 illustrates a process of sending a charging identification in accordance with an arrangement of a second embodiment of the present invention. In UMTS all-IP networks, when GPRS/UMTS is adopted as the access/transport network for multimedia and voice over IP services, charging will be performed independently at the GPRS/UMTS layer and at the application layer (e.g., the CSCF).

In the GPRS and UMTS networks, PDP contexts are created by the GGSN upon request from the SGSN (i.e., a Create PDP Context Request message) that, in turn, receives the request from the MT (i.e., an Activate PDP Context Request). According to the second embodiment of the invention, the Charging Identification parameter is sent from the SGSN or the GGSN to the CSCF. Unlike the first embodiment, there is no need to send the Charging Identification parameter via the UE.

As described previously, in the first embodiment of the invention, the MT intercepts data packets that are sent from the TE and adds the Charging Identification parameter to a specific data packet (the SIP message or the H.323 message for call set up). Interception of data packets may decrease the performance of the MT.

In the second embodiment of the invention, the GPRS/UMTS and IPT network elements are able to coordinate charging information or other kinds of information, e.g., in order to combine charging information collected for a PDP context by the SGSN and the GGSN and for a call by the CSCF. Like the first embodiment, the GGSN allocates a Charging Id parameter at PDP context activation. And like the first embodiment, the GGSN sends the Charging Id parameter to the SGSN. But, unique to the second embodiment, the Charging Identification, possibly together with other information (e.g., IMSI, MSISDN, PDP address, UE port number from the TFT, Charging Characteristics etc.) can be sent from the SGSN or the GGSN to the CSCF.

Sending the Charging Id parameter can be performed either autonomously or based on a request from the CSCF. The SGSN will send the Charging Identification, since the address of the CSCF has to be known if something will be sent to it. The SGSN has an interface with the HSS (HLR+UMS), which contains the address of the serving CSCF.

There also can be an interface between the GGSN and the CSCF. This new interface could then be used to carry the Charging Id and possibly other charging related information. FIG. 4 illustrates an aspect of the second embodiment of the invention in which the SGSN sends the Charging-Id parameter to the CSCF.

As illustrated in FIG. 4, a process of sending a charging identification in accordance with the present invention begins at step 400 in which a trigger is forwarded from the TE (Terminal Equipment) to the MT (Mobile Terminal). The trigger may be, e.g., a call set up message including the requested logical channels and characteristics.

At step 402, an Activate PDP Context Request message is forwarded to the SGSN. In response thereto, in step 404, the SGSN creates a Create PDP Context Request message.

In step 406, the SGSN sends the Create PDP Context Request to the GGSN. In response to the Create PDP Context Request received from the SGSN, in step 408, the GGSN creates a Create PDP Context Response. In step 410, the GGSN associates the Charging Identification parameter with the PDP context. In step 412, both the Create PDP Context Response and the Charging Identification are then returned to the SGSN in the Create PDP Context Response message.

The Charging Id is included in the CDRs created by the GGSN and the SGSN. The CDRs are sent to the Charging Gateway Functionality (CGR) for further processing. From the Charging Gateway Functionality, the CDRs are sent to the Billing System. This is true for all the embodiments. In addition, it is important that the CSCF adds the Charging Id to the CDRs that it creates for the call in question. The CSCF sends CDRs either to the Charging Gateway Functionality (CGF) or to the Billing System. This way, when creating a bill for a subscriber, the PDP context(s) that were used for a specific call can be checked. The Charging Identification in all those CDRs is the same.

If the Charging Characteristics change during an active PDP context, the SGSN includes the new Charging Characteristics of the PDP context in an Update PDP Context Request message, which the SGSN sends to the GGSN.

According to this arrangement of the second embodiment, the Charging Id parameter, possibly together with other information (e.g., IMSI, MSISDN, PDP address, UE port number from the TFT, Charging Characteristics etc.), is sent from the SGSN directly to the CSCF in step 414. This is done either autonomously (in a first case) or based on a request from the CSCF (in a second case).

In the first case, at PDP context activation (and modification), the SGSN sends a message including the Charging Id and possibly other information (see above) to the CSCF. The message sent by the SGSN may be acknowledged by the CSCF.

The SGSN must know the CSCF address. The CSCF address may be requested from the HSS or may be derived from the TFT which the UE specifies for the PDP context which is used for the communication with the CSCF.

In the second case, at call set up, the CSCF requests information from the SGSN. The request is based, e.g., on IMSI or MSISDN. The SGSN sends the Charging Id and possibly other information (see above) to the CSCF.

The CSCF must know the SGSN address. The SGSN address may be requested from the HSS.

The CSCF, in turn, forwards the call set up message to the remote end point in step 416. The remote end point then forwards a response message back to the CSCF in step 418. The CSCF then forwards the response message to the UE in step 420.

Figure 5:
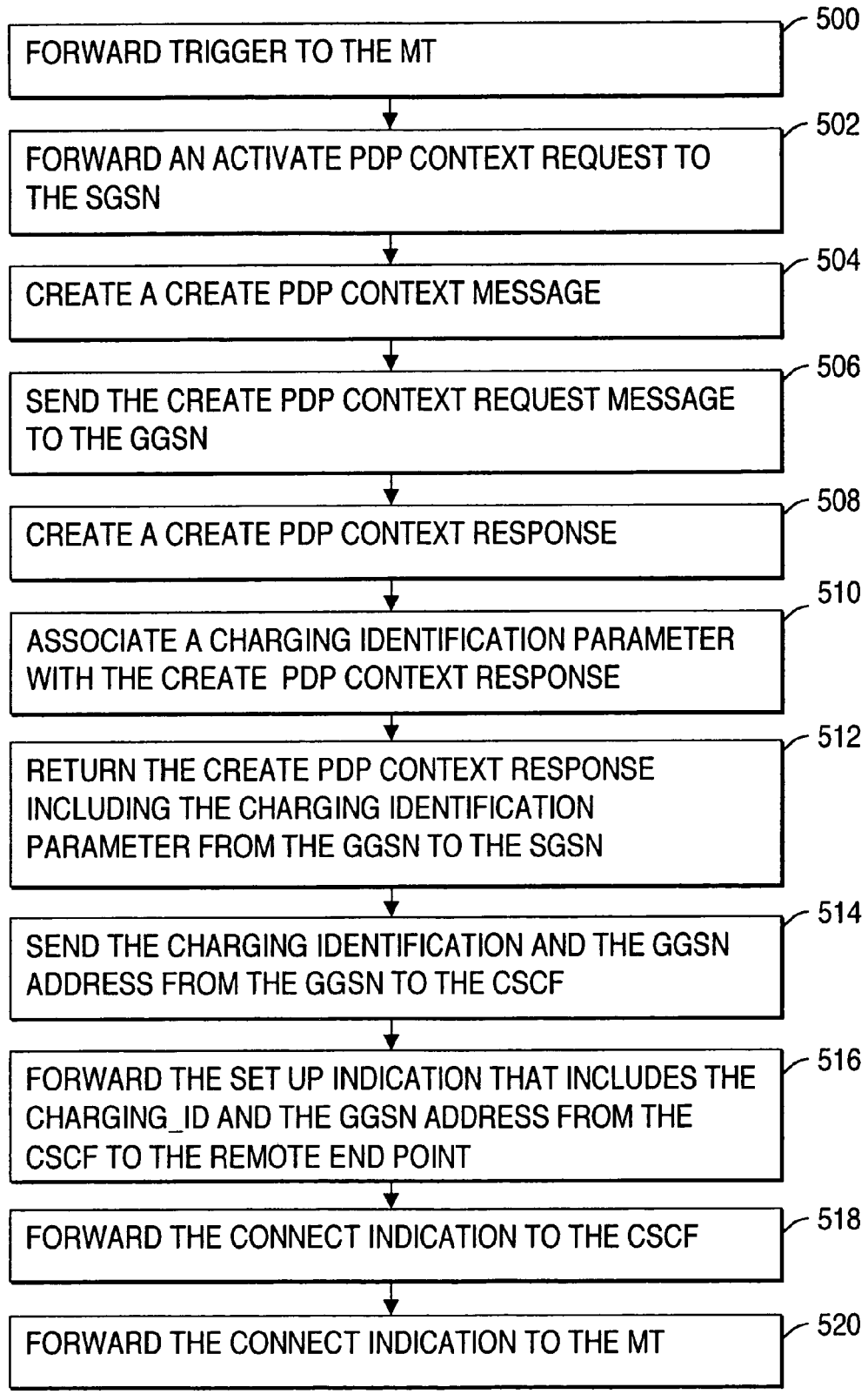
FIG. 5 is a generalized process flow diagram illustrating sending a charging identification in accordance with another arrangement of the second embodiment of the invention.

FIG. 5 illustrates another arrangement of the second embodiment of the invention in which the GGSN sends the Charging Identification directly to the CSCF. Referring to FIG. 5, a process of sending a charging identification in accordance with the present invention begins at step 500 in which a trigger is forwarded from the TE to the MT (Mobile Terminal). The trigger may be, e.g., a call set up message including the requested logical channels and characteristics.

At step 502, an Activate PDP Context Request message is forwarded to the SGSN. In response thereto, in step 504, the SGSN creates a Create PDP Context Request message. In step 506, the SGSN sends the Create PDP Context Request to the GGSN.

In response to the Create PDP Context Request received from the SGSN, in step 508, the GGSN creates a Create PDP Context Response. In step 510, the GGSN associates the Charging Identification parameter with the PDP context. In step 512, the Create PDP Context Response message including the Charging Identification is then returned to the SGSN.

According to this aspect of the second embodiment, the Charging Id parameter, possibly together with other information (e.g., IMSI, MSISDN, PDP address, UE port number from the TFT, Charging Characteristics etc.), is sent from the GGSN directly to the CSCF in step 514. Step 514 is performed either autonomously (in a first case) or based on a request from the CSCF (in a second case).

In the first case, at PDP context activation (and modification), the GGSN sends a message including the Charging Id and possibly other information (see above) to the CSCF. The message sent by the GGSN may be acknowledged by the CSCF.

The GGSN needs to know the CSCF address. The CSCF address may be requested from the HSS or may be derived from the TFT which the UE specifies for the PDP context that is used for the communication with the CSCF.

In the second case, at call set up, the CSCF requests information from the GGSN. The request is based, e.g., on IMSI or MSISDN. The GGSN sends the Charging Id parameter and possibly other information to the CSCF.

The CSCF forwards the call set up message to the remote end point in step 516. The remote end point then forwards a response message back to the CSCF in step 518. The CSCF then forwards the response message to the UE in step 520.

The second embodiment allows the GPRS and IPT network elements to coordinate charging information and other kinds of information, e.g., in order to combine charging information collected for a PDP context by the SGSN and the GGSN and for a call by the CSCF. Sending the Charging Identification from the SGSN or the GGSN to the CSCF requires an interface between the application layer network and the transport layer network.

Variation of Embodiments 1 and 2

In a variation of the first and second embodiments, the Charging Identification generated in the SGSN, GGSN or other network element is a Globally Unique Charging Identification (GCI). The GCI is a combination of the integer value $2^{32}-1$ (4 bytes) and the ID of the network element which generated it (such as the SGSN or GGSN). The length or structure of the network element ID generating the GCI may vary according to the specific implementation. It is not necessary that the GCI be generated in any particular group of network elements. In any circumstance, the remaining network elements simply receive and use the GCI generated by the first network element.

After the GCI is generated, it is used during the entire call and the other network elements don't generate a charging identification, but instead use the GCI generated by the first network element. The GCI is created and transferred over several interfaces in the place of the Charging Identification described above. A plurality of separate call detail records (CDRs) can be generated and associated with each other using the GCI. For example, the SGSN may create a S-CDR and the GGSN may create a G-CDR as explained in 3G TS 32.015. The CSCF (together with a MGCF) may create a C-CDR. A terminating network (such as a PSTN/MSC) may create POC and MTC CDRs.

When an endpoint (such as a MGCF) receives the GCI passed from the CSCF, it may pass it on to another network. Preferably, the GCI can be transferred to, within and between $2^{nd}$ generation ("2G") networks as well as the 3G network described above. The SIP and GTP' protocols may be used to carry the GCI in the 3G network as described above, and the corresponding protocols in a 2G network may be modified so that they can also carry the GCI. As an example, the connected 2G network may be a post-processing system which produces subscriber billing by effectively using the GCI to determine and combine charging data for the subscriber in one or more CDRs.

Embodiment 3

The subscribers of voice services are accustomed to receiving bills based on calls, not based on the transport resources used for making the calls. Subscribers of IP telephony often expect similar billing criteria. Consequently, billing for the services used (e.g., for the calls) rather than the transport resources used is becoming increasingly important. In the case of WAP services, billing for services rather than transport resources is already the expectation.

For an IP telephony call, a PDP context is required to carry the actual voice traffic. Both the GPRS/UMTS layer and the IP telephony layer collect charging information (CDRs): The GPRS/UMTS layer collects charging information for the PDP context while the IP telephony layer collects charging information for the call. A common identifier ought to be added to the CDRs to make it possible, for example, to bill based only on the CDRs created by the IP telephony layer (i.e., for services) and to omit the CDRs created by the GPRS/UMTS layer (i.e., for transport resources).

A common identifier is needed in the CDRs created by the GPRS/UMTS layer and by the IP telephony layer to make it possible to omit certain CDRs and enable billing based on services rather than use of transport resources. More specifically, in many cases it would be advantageous to selectively omit CDRs created by the GPRS/UMTS layer or CDRs created by the IP telephony layer. If that were possible, the billing would be operator-specific, in that the operator could decide how to bill the subscribers (how to use the created CDRs).

According to the principles of the invention, a common identifier is associated with the CDRs created by the GPRS/UMTS layer and by the IP telephony layer. The common identifier enables charging coordination and other kinds of information coordination.

Instead of using a GGSN-allocated Charging Identification, a call in SIP is identified with a Call Identification, which is used as a charging coordinator. The Call Identification is allocated by the caller and included in the SIP messages. The MS sends the SIP messages to the called party via the CSCF. The CSCF intercepts the SIP messages and can thereby obtain the Call Identification from the SIP messages.

To use the Call Identification for charging coordination or other kinds of coordination in accordance with the principles of the invention, the MS sends the Call Identification to the SGSN and the GGSN during PDP context activation. More specifically, the MS sends the Call Identification to the SGSN along with the Activate (Secondary) PDP Context Request message, and the SGSN forwards the Call Identification to the GGSN along with the Create PDP Context Request message.

Figure 6:
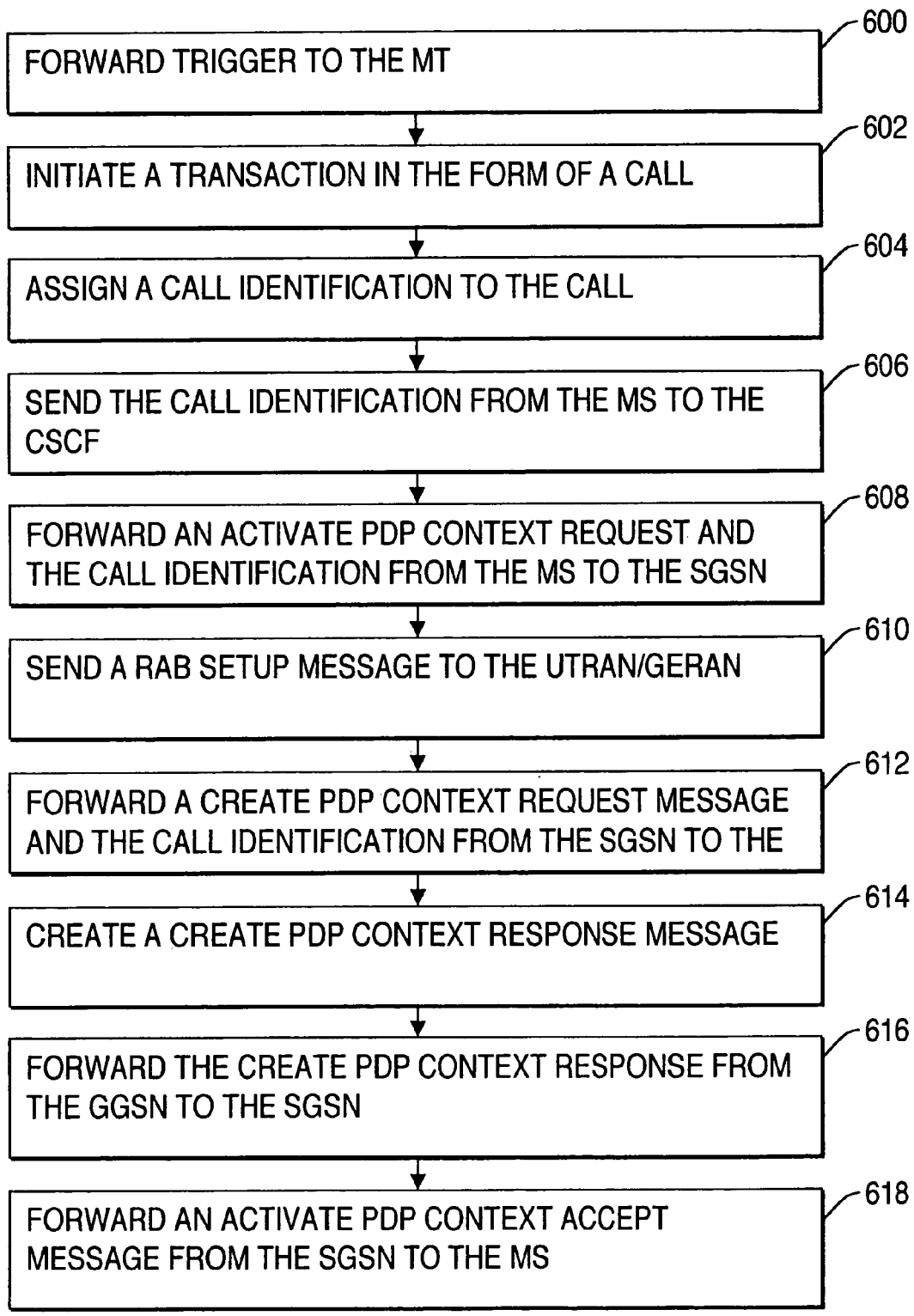
FIG. 6 is a generalized process flow diagram illustrating sending a call identification in accordance with a third embodiment of the invention.

FIG. 6 illustrates a process for coordinating charging in accordance with a third embodiment of the invention, which advantageously enhances coordination of information between transport and application layers. As illustrated in FIG. 6, the technique in accordance with the present invention begins at the application layer at step 600 in which a trigger is forwarded from the TE (Terminal Equipment) to the MT (Mobile Terminal). The trigger may be, e.g., a call set up indication including the requested logical channels and characteristics, sent from the TE to the MT to start PDP context activation. In step 602, the MS initiates a transaction in the form of a call. In step 604, the MS assigns a call identification to the call. The process described herein works for mobile-originated calls (where the MS allocates the Call Identification), as described subsequently with respect to FIG. 7, and also for mobile-terminated calls (where the MS receives the Call Identification in the SIP Invite message), as described subsequently with respect to FIG. 8. In step 606, the call identification is sent from the MS to the CSCF.

In step 608, an Activate (Secondary) PDP Context Request message and a Call Identification is forwarded from the MS to the SGSN. In step 610, the SGSN sends a Radio Access Bearer (RAB) setup message to the UTRAN. In response thereto, in step 612, the SGSN creates a Create PDP Context Request message and forwards it to the GGSN along with the Call Identification. In response to the Create PDP Context Request forwarded by the SGSN, in step 614, the GGSN creates a Create PDP Context Response message.

In step 616, the Create PDP Context Response message is forwarded to the SGSN. In response to the PDP Context Response forwarded by the GGSN to the SGSN, in step 618, the SGSN forwards an Activate (Secondary) PDP Context Accept message to the MS.

According to the process described herein, the SGSN and the GGSN add the Call Identification to the CDRs that they create for the PDP context, and the CSCF adds the Call Identification to the CDRs that it creates for the call.

Accordingly, an operator is given greater flexibility in deciding how to bill subscribers for the created CDRs. The operator can selectively omit billing for CDRs created by the GPRS/UMTS layer while choosing to bill for CDRs created by the IP telephony layer.

Figure 7:
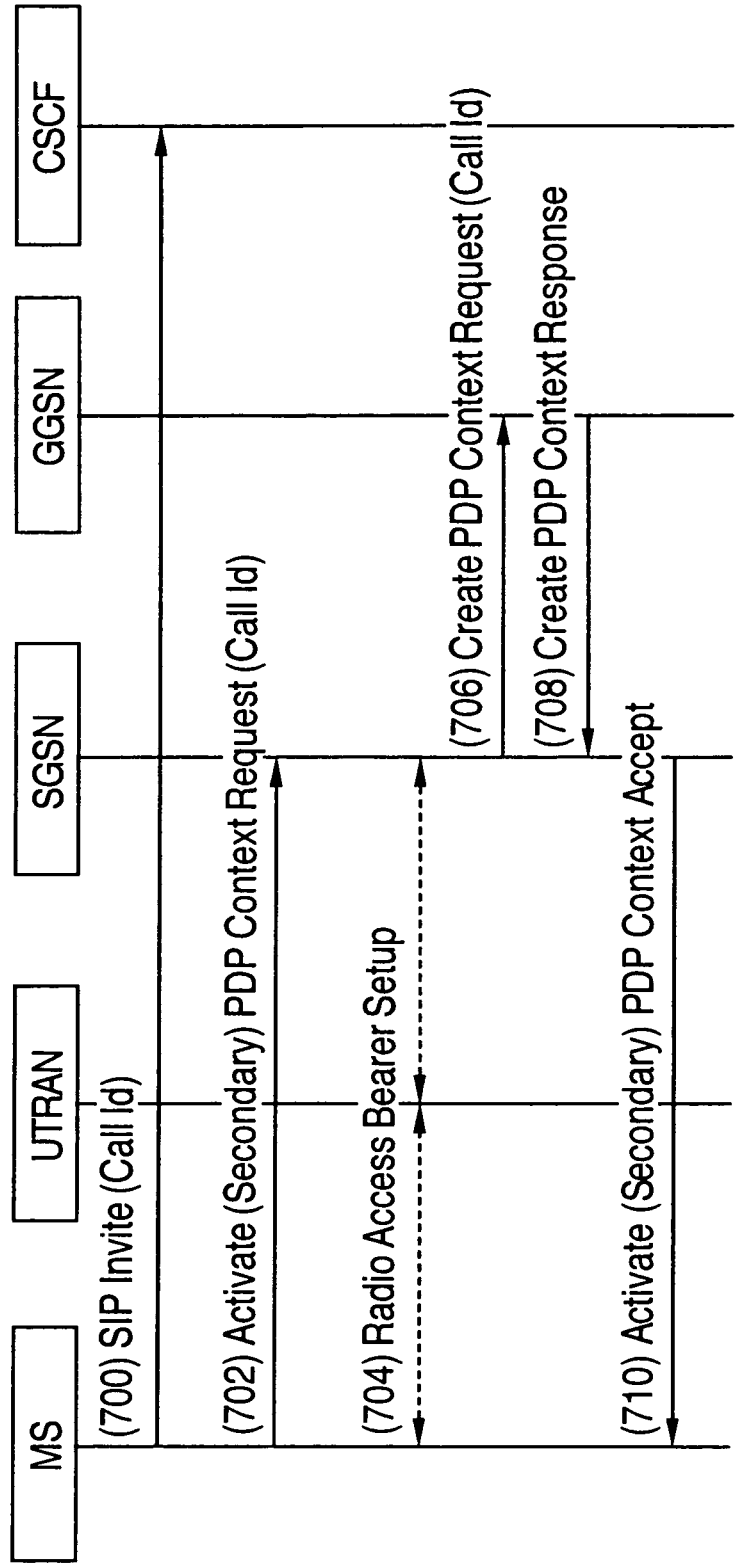
FIG. 7 is a generalized signaling flow diagram illustrating coordination of the application layer and transport layer in accordance with an arrangement of the third embodiment of the invention.

FIG. 7 is a signaling flow diagram illustrating coordination of the application layer and transport layer in accordance with an arrangement of the third embodiment of the invention. To enable charging coordination or other kinds of information coordination for a mobile-originated call, the Call Id is sent to the CSCF at call set up and to the SGSN and to the GGSN at PDP context activation. With reference to FIG. 7, at 700, the MS allocates a Call Id and sends it to the CSCF in the SIP Invite message. At 702, the MS activates at least one PDP context for the call. The MS sends the Call Id to the SGSN in the Activate (Secondary) PDP Context Request message. If multiple PDP contexts are activated for the call, the MS has to send the Call Id to the SGSN at every PDP context activation. At 704, the radio access bearer setup is performed. At 706, the SGSN sends the Call Id to the GGSN in the Create PDP Context Request message. At 708 and 710, the (secondary) PDP context activation is accepted.

Figure 8:
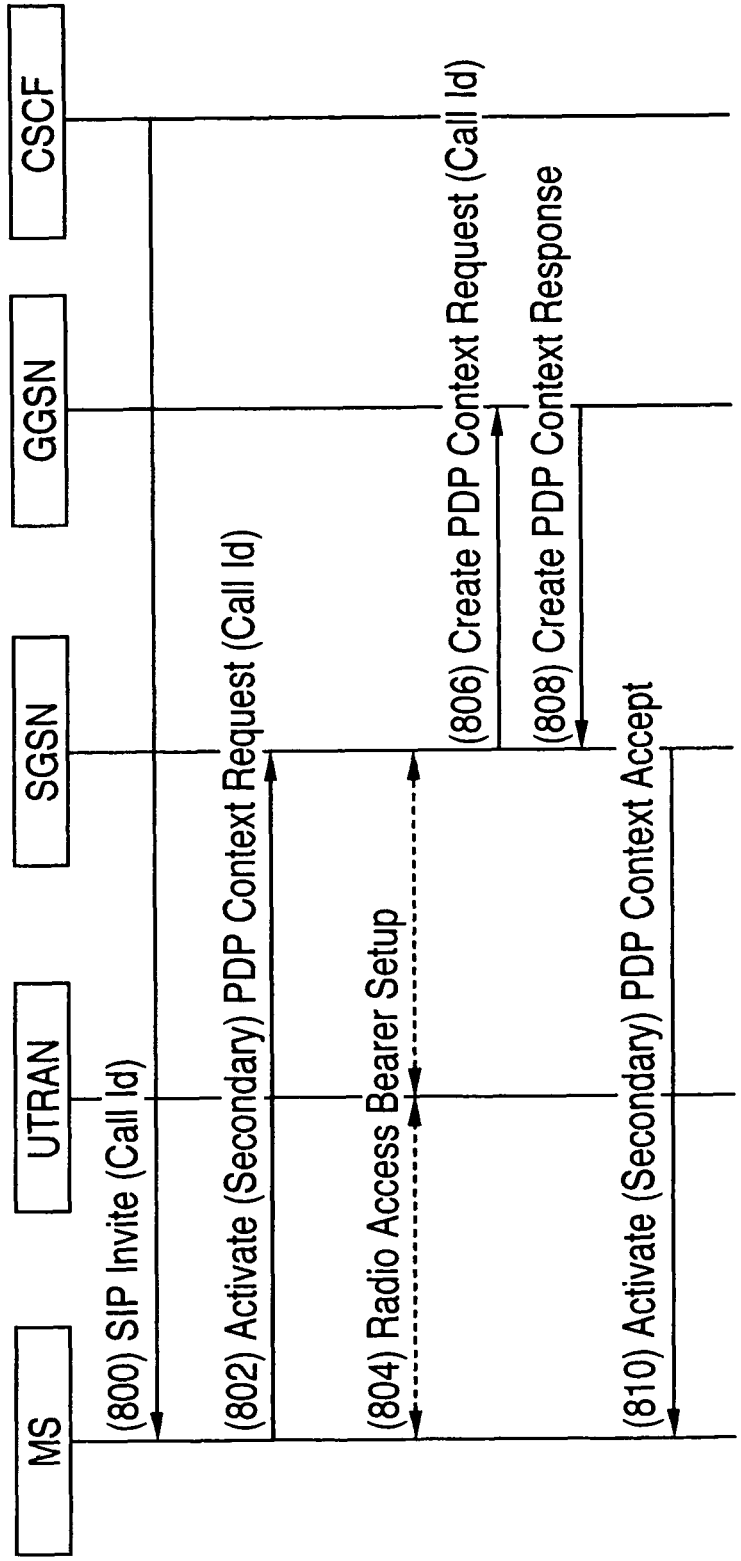
FIG. 8 is a generalized signaling flow diagram illustrating coordination of the application layer and transport layer in accordance with another arrangement of the third embodiment of the invention.

FIG. 8 is a signaling flow diagram illustrating coordination of the application layer and transport layer in accordance with another arrangement of the third embodiment of the invention. FIG. 8 presents an example of charging coordination for a mobile-terminated call. With reference to FIG. 8, at 800 the MS receives the SIP Invite message. The caller has allocated the Call Id for the call. At 802, the MS activates at least one PDP context for the call. The MS sends the Call Id to the SGSN in the Activate (Secondary) PDP Context Request message. If multiple PDP contexts are activated for the call, the MS has to send the Call Id to the SGSN at every PDP context activation. At 804, the radio access bearer setup is performed. At 806, the SGSN sends the Call Id to the GGSN in the Create PDP Context Request message. At 808 and 810, the (secondary) PDP context activation is accepted.

Embodiment 4

In another embodiment similar to Embodiment 3 described above, the common identifier associated with the CDRs created by the GPRS/UMTS layer and by the IP telephony layer is a tuple or tuple pair used to differentiate connections in IP networking. A "tuple" consists of the IP address and UDP port values related to the RTP data flow of the connection. A "tuple pair" consists of the tuples for both the source and destination side connection endpoints. To use the tuple or tuple pair for charging coordination or other kinds of information coordination in accordance with the principles of the invention, the MS sends them to the SGSN and the GGSN during PDP context activation. More specifically, the MS sends them to the SGSN along with the Activate (Secondary) PDP Context Request message, and the SGSN forwards them to the GGSN along with the Create PDP Context Request message.

The process for coordinating charging in accordance with this fourth embodiment of the invention is illustrated in FIG. 9. At step 900, a trigger is forwarded from the TE (Terminal Equipment) to the MT (Mobile Terminal). The trigger may be, e.g., a call set up indication including the requested logical channels and characteristics, sent from the TE to the MT to start PDP context activation. In step 902, the MS initiates a transaction in the form of a call. In step 904, the MS assigns the tuple for each proposed media flow it suggests to use within the call. This information will then be carried in the SDP part of SIP INVITE and be used as destination tuple by the remote endpoint, if the remote endpoint agrees to use the proposed media. The process described herein works for mobile-originated calls (where the MS allocates the UDP/IP tuple values), as described subsequently with respect to FIG. 9, and also for mobile-terminated calls (where the MS receives the tuple in the SIP INVITE message), as described subsequently with respect to FIG. 9. In step 906, the tuple is sent from the MS to the CSCF.

In step 908, the media negotiation has traversed the necessary round-trips through the CSCF signalling chain and the terminating MS knows at least the initially agreed destination and source connection tuples (a tuple pair) for each media flow. Preferably, the P-CSCF of both the originating and terminating terminals parse and grab the tuple pair values from passing SIP messages (for media authorization and policy control purposes). An Activate (Secondary) PDP Context Request message and the connection specific tuple pair information is forwarded from the MS to the SGSN. In step 910, the SGSN sends a Radio Access Bearer (RAB) setup message to the UTRAN. In response thereto, in step 912, the SGSN creates a Create PDP Context Request message and forwards it to the GGSN along with the tuple pair. In response to the Create PDP Context Request forwarded by the SGSN, in step 914, the GGSN creates a Create PDP Context Response message.

In step 916, the Create PDP Context Response message is forwarded to the SGSN. In response to the PDP Context Response forwarded by the GGSN to the SGSN, in step 918, the SGSN forwards an Activate (Secondary) PDP Context Accept message to the MS.

According to the process described herein, the SGSN and the GGSN add the tuple pair to the CDRs that they create for the PDP context, and the CSCF adds the tuple pair present in media specific part (e.g., SDP) of SIP signalling to the CDRs that it creates for the call.

Accordingly, an operator is given greater flexibility in deciding how to bill subscribers for the created CDRs. The operator can selectively omit billing for CDRs created by the GPRS/UMTS layer while choosing to bill for CDRs created by the IP telephony layer.

FIG. 10 is a signaling flow diagram illustrating coordination of the application layer and transport layer in accordance with an arrangement of the fourth embodiment of the invention. To enable charging coordination or other kinds of information coordination for a mobile-originated call, the tuple or tuple pair is sent to the CSCF at call set up and to the SGSN and to the GGSN at PDP context activation. With reference to FIG. 10, at 1000, the MS allocates a tuple for each proposed media flow it suggests to use within the call. This information will then be carried in a media specific (e.g., SDP) part of SIP INVITE and be used as destination tuple by the remote endpoint, if it agrees to use the proposed media.

MS sends the tuples for each proposed media flow to the CSCF in the SIP INVITE message. Prior to this signalling, the MS activates at least one (signalling) PDP context for the call if one is not already activated. After the media negotiation has traversed the necessary round-trips through the CSCF signalling chain and both originating and terminating terminal know the at least initially agreed destination and source connection tuples (a tuple pair) for each media flow, the MS sends the connection specific tuple pair to the SGSN in the Activate (Secondary) PDP Context Request message. If multiple PDP contexts (multiple media) are activated for the call, the MS has to send the tuple pair assigned to the particular media flow to the SGSN at every PDP context activation. At 1004, the radio access bearer setup is performed. At 1006, the SGSN sends the tuple pair to the GGSN in the Create PDP Context Request message. At 1008 and 1010, the (secondary) PDP context activation is accepted.

FIG. 11 is a signaling flow diagram illustrating coordination of the application layer and transport layer in accordance with another arrangement of the fourth embodiment of the invention. FIG. 11 presents an example of charging coordination or other kinds of information coordination for a mobile-terminated call. With reference to FIG. 11, at 1100 the MS receives the SIP INVITE message. The caller has allocated the destination tuple values for each intended original or dynamically added media component for the call. At 1102, the MS activates at least one secondary PDP context for the call. The MS sends the tuple or tuple pair to the SGSN in the Activate (Secondary) PDP Context Request message. If multiple PDP contexts are activated for the call, the MS has to send the tuple or tuple pair to the SGSN at every PDP context activation. At 1104, the radio access bearer setup is performed. At 1106, the SGSN sends the tuple pair to the GGSN in the Create PDP Context Request message. At 1108 and 1110, the (secondary) PDP context activation is accepted.

The use of the tuple pairs in the fourth embodiment simplifies the terminal inter-layer (application layer—GPRS/UMTS layer) processing and can be used effectively regardless of whether the MS is a TE+MT combination or a unified UE. This is because the connection specific UDP and TCP port information is sent automatically without need for specific MT interception/parsing process of SIP messages from TE (as in the third embodiment) or adding an extra message (charging ID received from SGSN) to TE-originated SIP messages. The port information is sent to both CSCF in SDP part of SIP INVITE or ACK message at application layer and to SGSN & GGSN in the TFT information of PDP Context Activation Request message (The tuple pair included to each PDP context's TFT needs to be forwarded to the MT's GPRS session management layer—this can e.g. be done via MT's implementation specific bearer management or QoS application programming interface (API)).

As a variation of the fourth embodiment, in the CSCF-GGSN interface end, the tuple pairscan be used as the key identifiers to which the charging ID (and policing authorization) is assigned or linked to, although the charging ID would be used for the identifier in CGR and billing. A call is triggered over the primary (signalling) PDP context by sending a call setup (in SIP: INVITE) message with logical channel information for the receiver side (i.e., the ports to which it is ready to receive real-time data. The CSCF receives the INVITE with SDP (with coded bandwidth and port information) and stores the information. The signalling is sent to the remote end, which is answered (e.g., SIP 183 message) and the CSCF now receives a new set of SDP information with codec, bandwidth and terminating side destination ports provided by the remote end SDP. CSCF executed examination of the codec type data received from SIP messages from both terminals results in an agreed codec set, whose destination [IP address, port] tuple values are known for each IP connection CSCF should authorise.

The CSCF can use the CSCF-PCF-GGSN interfaces (or CSCF-GGSN if PCF is integrated to CSCF) to request policy control actions (bandwidth authorization) and charging coordination between layers with the tuplesas keys. The GGSN admits the bandwidth and later during the secondary PDP context activation process, assigns the charging ID to the created PDP context associated with the key tuple values, and forwards the charging ID back to the CSCF for charging coordination purposes. The CSCF doesn't need to parse the Charging-ID from received SIP messages—there is no risk of malicious MT since it won't be intercepting or modifying any SIP messages received from a TE. Instead it can correlate the charging ID sent by GGSN to the port information.

The charging flexibility offered for the operator is further improved in the fourth embodiment if the TE sends a RE-INVITE message with changed QoS/codec information, since the CSCF will notice outcome of the dynamic change in the resulting signalling, and request new authorization and get a new charging ID. Furthermore, a new charging ID will be created to charging records for each new dynamically added real-time PDP context/media flow. If the real-time flows are to utilise RTP/UDP/IP header compression at the PDP layer, each media flow needs its own PDP context. Thus, operator charging can, if desired, follow the media changes (audio to videotelephony back to audio, . . . ) within an end-to-end call. Following the process described in the third embodiment of this invention, the Call-ID would not change and would not indicate the media specific connection details in the charging information if, for example, SGSN and GGSN CDRs are omitted by an operator decision.

It is to be noted that in the description of the invention above, numerous details known to those skilled in the art have been omitted for the sake of brevity. Such details are readily available in numerous publications including the previously cited protocols.

Although the present invention has been described with reference to a number of illustrative embodiments, it should be understood that numerous other modifications and embodiments can be devised by those skilled the art which will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled the art.

What is claimed is:

1. A method comprising:
   creating a charging identification in a first network element in one of an application layer network of a communication network or a transport layer network of the communication network;
   sending said charging identification from said first network element to a second network element in the other one of the application layer network or the transport layer network;
   creating, in said first network element, call records for a first connection to user equipment via said application layer network;
   creating, in said second network element, call records for a second connection to said user equipment via said transport layer network;
   including said charging identification in said call records for said first connection and in said call records for said second connection;
   sending said call records for said first connection and said call records for said second connection to a billing system of the communication network; and
   coordinating charging information in the communications network using said charging identification included in the call records of said first and second network elements.

2. The method of claim 1, further comprising:
   adding, in said second network element, said charging identification to charging information which said second network element collects.

3. The method of claim 1, further comprising:
   sending, by said first network element, an address of the first network element together with said charging identification to said second network element.

4. The method of claim 3, wherein said second network element adds said address of said first network element to charging information which said second network element collects.

5. The method of claim 1, wherein said charging identification is sent from said first network element to said second network element via an interface between the transport layer network and said application layer network.

6. The method of claim 1, wherein said first network element is a Mobile Station (MS) and the method further comprises:
   providing, by said Mobile Station, the charging identification to both of the application layer network and the transport layer network.

7. The method of claim 1, further comprising:
   sending, by said first network element, security information together with said charging identification to said second network element.

8. The method of claim 7, further comprising:
   verifying, by said second network element, said charging identification against said security information.

9. The method of claim 1, further comprising:
sending, by said second network element, said charging identification towards an endpoint of a communication.

10. The method of claim 9, further comprising:
sending, by said second network element, security information together with said charging identification toward said endpoint of a communication.

11. The method of claim 9, further comprising:
sending, by said second network element, an address of said first network element together with said charging identification to said endpoint of a communication.

12. The method of claim 11, further comprising:
adding, in said second network element, an address of said first network element to charging data which said second network element collects.

13. The method of claim 1, wherein the first network element is in said transport layer network.

14. The method of claim 13, wherein said charging identification is sent to said second network element in said application layer network.

15. The method of claim 14, further comprising:
forwarding said charging identification to a third network element and a fourth network element in said transport layer network.

16. The method of claim 15, further comprising:
associating said charging information with additional charging information created by each of said second, third and fourth network elements.

17. The method of claim 1, wherein the charging identification comprises a tuple or tuple pair.

18. The method of claim 17, wherein said tuple includes a destination IP address and port information of a transaction specific media connection.

19. The method of claim 1, further comprising:
sending, by said first network element, said charging identification to said second network element via the user equipment, wherein said second network element receives said charging identification from the user equipment in a request to setup a connection in the other one of the application layer network or the transport layer network.

20. An apparatus, comprising:
one or more processors; and
memory storing executable instructions configured to, with the one or more processors, cause the apparatus at least to:
create call records, include a charging identification in the call records, and send said call records to a billing system;
coordinate charging information using said charging identification included in the call records;
establish a first connection to user equipment via an application layer network of a communications network and a second connection to said user equipment via a transport layer network of the communications network;
create the charging identification in one of said application layer network or said transport layer network; and
send said charging identification to a network element in the other one of the application layer network or the transport layer network.

21. The apparatus of claim 20, wherein the user equipment is operable to initiate the first connection and the second connection.

22. The apparatus of claim 21, wherein the apparatus is caused to send said charging identification to the network element via the user equipment in a request to set up a connection in the other one of the application layer network or the transport layer network.

23. The apparatus of claim 22, wherein said connection comprises a PDP context.

24. The apparatus of claim 21, wherein said user equipment comprises another network element, and the user equipment is adapted to provide the charging identification to both of the application layer network and the transport layer network.

25. The apparatus of claim 20, wherein the charging identification comprises a tuple or tuple pair.

26. The apparatus of claim 25, wherein the apparatus comprises a Gateway GPRS Support Node and the network element comprises a Call State Control Function.

27. The apparatus of claim 20, wherein an interface between first and second network elements is caused to directly send said charging identification from said first network element to said second network element.

28. The apparatus of claim 20, wherein said network element comprises a Call State Control Function.

* * * * *

UNITED STATES PATENT AND TRADEMARK OFFICE
CERTIFICATE OF CORRECTION

PATENT NO. : 8,699,472 B2  
APPLICATION NO. : 09/758267  
DATED : April 15, 2014  
INVENTOR(S) : Stefano Faccinn et al.

Page 1 of 1

It is certified that error appears in the above-identified patent and that said Letters Patent is hereby corrected as shown below:

On the title page under item [75] Inventors  
        Delete "H≡meenlinna" and insert -- Hameenlinna --

Signed and Sealed this  
Twelfth Day of August, 2014

Michelle K. Lee  
*Deputy Director of the United States Patent and Trademark Office*